US009087085B2

(12) United States Patent
Hursh et al.

(10) Patent No.: US 9,087,085 B2
(45) Date of Patent: Jul. 21, 2015

(54) PRE-ASSIMILATION VALUES AND POST-ASSIMILATION VALUES IN HARDWARE INSTANCE IDENTIFIERS

(71) Applicant: International Business Machines Corporation, Armonk, NY (US)

(72) Inventors: Daniel M. Hursh, St. Charles, MN (US); Paul E. Movall, Rochester, MN (US); Eric J. Nelson, Rochester, MN (US); Brett J. Reese, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/710,132

(22) Filed: Dec. 10, 2012

(65) Prior Publication Data

US 2014/0164424 A1    Jun. 12, 2014

(51) Int. Cl.
*G06F 17/30* (2006.01)
(52) U.S. Cl.
CPC .... *G06F 17/30289* (2013.01); *G06F 17/30424* (2013.01)
(58) Field of Classification Search
USPC .................. 707/622, 623; 709/209
See application file for complete search history.

(56) References Cited

U.S. PATENT DOCUMENTS

| | | | | |
|---|---|---|---|---|
| 5,717,853 | A * | 2/1998 | Deshpande et al. | 709/222 |
| 6,519,697 | B1 * | 2/2003 | Denman et al. | 713/1 |
| 6,594,698 | B1 * | 7/2003 | Chow et al. | 709/226 |
| 8,046,759 | B2 * | 10/2011 | de Rose et al. | 718/101 |
| 8,225,105 | B2 | 7/2012 | Brinker et al. | |
| 8,271,537 | B2 | 9/2012 | Schabenberger et al. | |
| 8,392,388 | B2 | 3/2013 | Pasupuleti et al. | |
| 8,488,446 | B1 * | 7/2013 | Brandwine | 370/225 |
| 8,510,420 | B1 * | 8/2013 | Brandwine et al. | 709/220 |
| 8,516,220 | B2 * | 8/2013 | Yan et al. | 711/205 |
| 8,621,269 | B2 * | 12/2013 | Vas et al. | 714/6.2 |
| 8,671,151 | B2 * | 3/2014 | Joshi et al. | 709/208 |
| 8,717,895 | B2 * | 5/2014 | Koponen et al. | 370/235 |
| 2003/0091267 | A1 * | 5/2003 | Alvarez et al. | 385/16 |
| 2003/0149735 | A1 * | 8/2003 | Stark et al. | 709/208 |
| 2005/0021713 | A1 * | 1/2005 | Dugan et al. | 709/223 |
| 2006/0047771 | A1 * | 3/2006 | Blackmore et al. | 709/209 |
| 2007/0286097 | A1 * | 12/2007 | Davies | 370/255 |
| 2008/0271140 | A1 | 10/2008 | Brinker et al. | |
| 2009/0216910 | A1 * | 8/2009 | Duchesneau | 709/250 |
| 2010/0054242 | A1 * | 3/2010 | Oliver et al. | 370/389 |
| 2010/0088685 | A1 * | 4/2010 | Ahmed et al. | 717/140 |
| 2011/0029508 | A1 * | 2/2011 | Al-Omari et al. | 707/718 |
| 2013/0060940 | A1 * | 3/2013 | Koponen et al. | 709/225 |
| 2013/0091144 | A1 * | 4/2013 | Peters et al. | 707/748 |
| 2013/0124726 | A1 | 5/2013 | Branson et al. | |

FOREIGN PATENT DOCUMENTS

| | | |
|---|---|---|
| EP | 1019841 B1 | 7/2000 |
| WO | 9742572 A1 | 11/1997 |
| WO | 2004013770 A2 | 2/2004 |

* cited by examiner

*Primary Examiner* — Leslie Wong
(74) *Attorney, Agent, or Firm* — Toler Law Group

(57) ABSTRACT

A method of managing a database may include, at a node, assigning a pre-assimilation value to a hardware instance identifier of a hardware component before the node is assimilated into a multi-node computing system. The method may also include receiving a post-assimilation value after the node has been assimilated into the multi-node computing system. The method may also include updating the pre-assimilation value with the post-assimilation value.

16 Claims, 7 Drawing Sheets

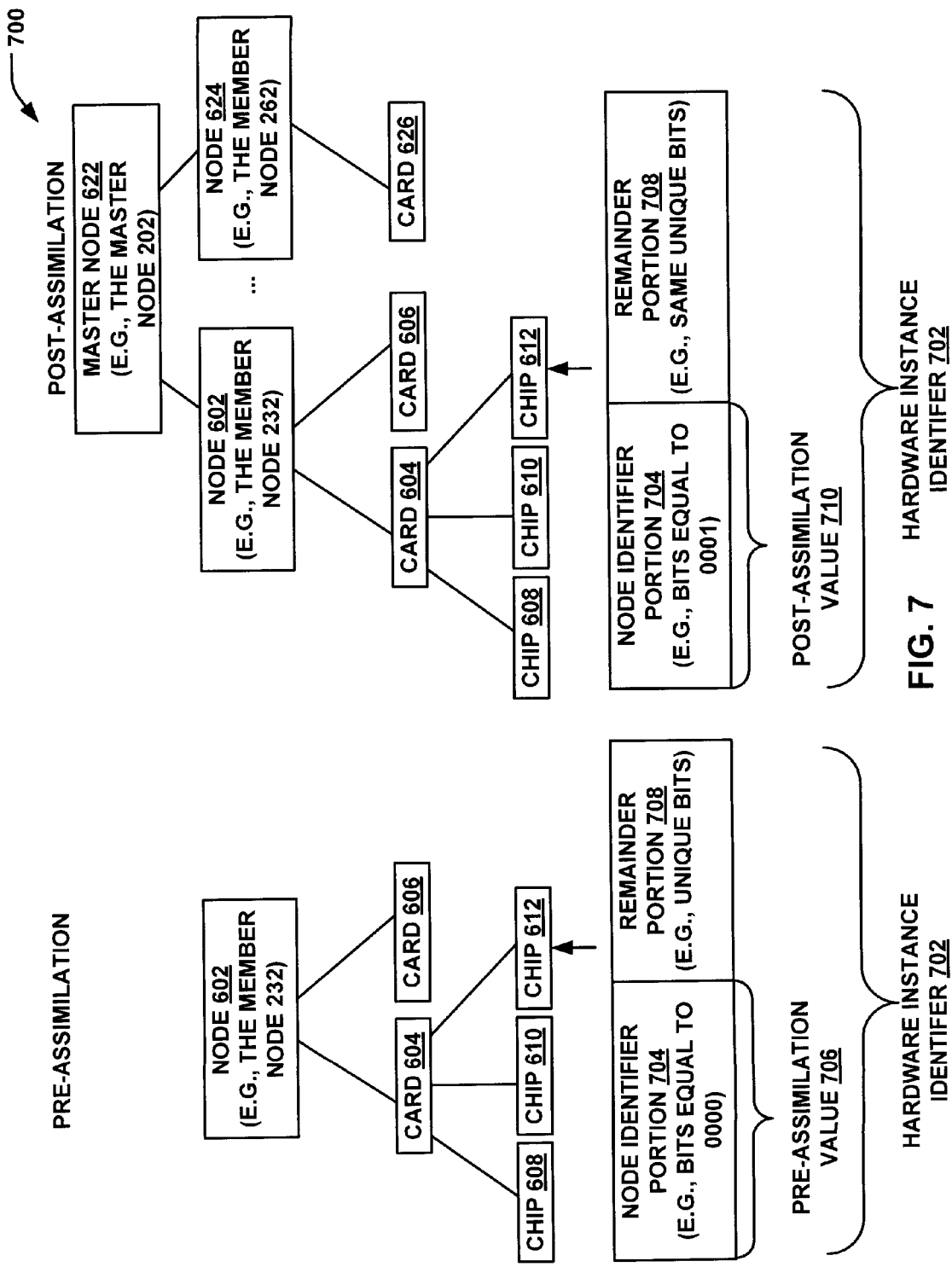

PRE-ASSIMILATION VALUES AND POST-ASSIMILATION VALUES IN HARDWARE INSTANCE IDENTIFIERS

I. FIELD OF THE DISCLOSURE

The present disclosure relates generally to nodes transitioning from a local only mode of operation to a distributed mode of operation.

II. BACKGROUND

An individual node may initially operate a database independently of other nodes in a local only mode of operation. At a later point in time, the individual node may join a group of nodes and begin operating in a distributed mode. In distributed mode, data of the individual node's database may be merged with data of databases of other nodes. However, the transition from local only mode to distributed mode may lead to inefficiencies. For example, the transition may include copying data, which may be error prone and may waste resources, such as memory and processing resources. Furthermore, operations started in the individual node during the local only mode may be negatively affected by the transition. For example, the operations may try to use invalid data, may be stopped, or may have to be restarted.

III. SUMMARY

In a particular embodiment, a method of managing a database may include, at a node, assigning a pre-assimilation value to a hardware instance identifier of a hardware component before the node is assimilated into a multi-node computing system. The method may also include receiving a post-assimilation value after the node has been assimilated into the multi-node computing system. The method may also include updating the pre-assimilation value with the post-assimilation value.

In a particular embodiment, an apparatus may include a memory storing program code, and a processor configured to access the memory and execute the program code to, at a node, assign a pre-assimilation value to a hardware instance identifier of a hardware component before the node is assimilated into a multi-node computing system. The processor may also be configured to execute program code to receive a post-assimilation value after the node has been assimilated into the multi-node computing system. The processor may also be configured to execute program code to update the pre-assimilation value with the post-assimilation value.

In a particular embodiment, a program product may include program code to, at a node, assign a pre-assimilation value to a hardware instance identifier of a hardware component before the node is assimilated into a multi-node computing system. The program code may also receive a post-assimilation value after the node has been assimilated into the multi-node computing system. The program code may also update the pre-assimilation value with the post-assimilation value. The program product may further include a non-transitory computer readable medium bearing the program code.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

FIG. 7 is an example consistent with the embodiment of the second method of FIG. 4.

V. DETAILED DESCRIPTION

Figure 1:
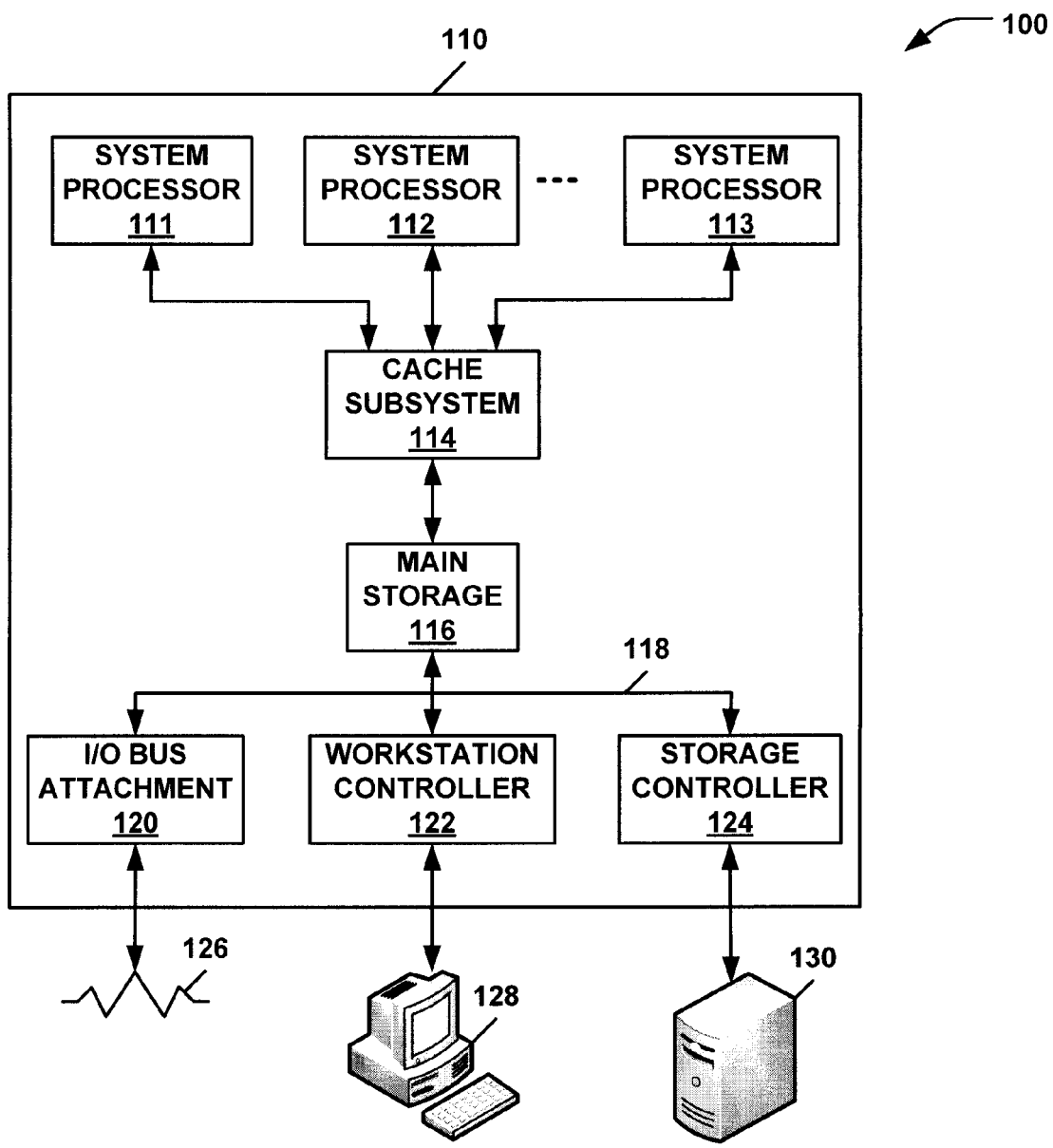
FIG. 1 illustrates a data processing apparatus consistent with an embodiment.

Embodiments for managing a database using pre-assimilation values and post-assimilation values in hardware instance identifiers are provided herein. The pre-assimilation values and post-assimilation values may facilitate a node's transition from local only mode to distributed mode. Moreover, the pre-assimilation values and post assimilation values may facilitate merger of data of the node's database into a distributed database (or master copy) at a master node of a multi-node computing system.

In particular, each node may include at least one hardware component, such as a card, a chip, or practically any kind of hardware component. Each hardware component may be referenced by a hardware instance identifier or hardware instance ID. A hardware instance identifier may be a complex data type, may be about 32 bits, may be about 64 bits, etc. Indeed, a hardware instance identifier may be practically any data structure capable of holding a value, such as a pre-assimilation value or a post-assimilation value. A hardware instance identifier may be used by a software layer, for example, to work with a hardware component.

Specifically, at a node, a pre-assimilation value may be assigned to a hardware instance identifier of a hardware component before the node is assimilated into a multi-node computing system. For example, the node may be assimilated into the multi-node computing system by a master node of the multi-node computing system. The node may receive a post-assimilation value after the node has been assimilated into the multi-node computing system. For example, the master node of the multi-node computing system may send the post-assimilation value to the node. The node may update the pre-assimilation value with the post-assimilation value. Indeed, the node may execute these steps for a plurality of hardware components. For example, each node may include hardware instance identifiers for substantially a maximum configuration of hardware components possible in the multi-node computing system, and each hardware instance identifier may be assigned a pre-assimilation value that is subsequently updated with a post-assimilation value.

By doing so, the node may start collecting, storing, and associating data in its database using the assigned pre-assimilation value of the hardware instance identifier of the hardware component before the node has been assimilated into the multi-node computing system. After assimilation, the node may search its database and queries for references to the hardware instance identifier with the pre-assimilation value, as well as update the pre-assimilation value in the identified references with the post-assimilation value.

Additionally, by doing so, the transition from local only mode to distributed mode, including merger of data of the node's database into the distributed database, may be improved. For example, the data of the node's database may be merged into the distributed database with less copying or no copying of data. Indeed, the node may be able to avoid creating and storing multiple copies of the data, such as avoid a pre-assimilation copy of the data and a post-assimilation copy of data. Multiple copies may be error prone (e.g., lost data, invalid references, stale data, etc.) and may waste resources (e.g., a copy may be a large size such as hundreds of megabytes and may take up a large space in a memory assuming the space is available, creating the copy, etc.). The higher the quantity of nodes and hardware components, the higher the potential savings. Operations started in the node before assimilation may also continue to utilize the pre-assimilation value after assimilation, potentially reducing scenarios where operations try to use invalid data, are stopped, or are restarted. Thus, the node may transition seamlessly, without creating copies, without rediscovery, and the node may be available in real-time for operations throughout the transition.

Of note, the term "pre-assimilation" or "before assimilation" may be used interchangeably herein, and may simply indicate a period before a node is assimilated into a multi-node computing system. For example, "pre-assimilation" or "before assimilation" may indicate a period before a node is assigned a position in a multi-node computing system (e.g., a position in a tree or hierarchy of the multi-node computing system). The term "post-assimilation" or "after assimilation" may be used interchangeably herein, and may simply indicate a period after a node is assimilated into a multi-node computing system. For example, "post-assimilation" or "after assimilation" may indicate a period after a node is assigned a position in a multi-node computing system (e.g., a position in a tree or hierarchy of the multi-node computing system). Assimilating a node may also include assimilating hardware components of the node.

Turning more particularly to the drawings, FIG. 1 generally illustrates a data processing apparatus 100 consistent with an embodiment. For example, the apparatus 100 may be an embodiment of a node before the node is assimilated into a multi-node computing system. The apparatus 100 may also be an embodiment of a node after the node is assimilated into the multi-node computing system. Before assimilation, the apparatus 100 may simply be a node, but after assimilation, the apparatus 100 may be a member node or a master node of the multi-node computing system. A plurality of apparatus 100 may be assimilated into the multi-node computing system.

The apparatus 100, in specific embodiments, may include a computer, a computer system, a computing device, a server, a disk array, client computing entity, or other programmable device, such as a multi-user computer, a single-user computer, a handheld device, a networked device (including a computer in a cluster configuration), a mobile phone, a video game console (or other gaming system), etc. The apparatus 100 may be referred to as a logically partitioned computing system or computing system, but may be referred to as computer for the sake of brevity. One suitable implementation of the computer 110 may be a multi-user computer, such as a computer available from International Business Machines Corporation (IBM).

The computer 110 generally includes one or more physical processors 111, 112, 113 coupled to a memory subsystem including a main storage 116. The main storage 116 may include one or more dual in-line memory modules (DIMMs). The DIMM may include an array of dynamic random access memory (DRAM). Another or the same embodiment may a main storage having a static random access memory (SRAM), a flash memory, a hard disk drive, and/or another digital storage medium. The processors 111, 112, 113 may be multithreaded and/or may have multiple cores. A cache subsystem 114 is illustrated as interposed between the processors 111, 112, 113 and the main storage 116. The cache subsystem 114 typically includes one or more levels of data, instruction and/or combination caches, with certain caches either serving individual processors or multiple processors.

The main storage 116 may be coupled to a number of external input/output (I/O) devices via a system bus 118 and a plurality of interface devices, e.g., an I/O bus attachment interface 120, a workstation controller 122, and/or a storage controller 124 that respectively provide external access to one or more external networks 126, one or more workstations 128, and/or one or more storage devices such as a direct access storage device (DASD) 130. The system bus 118 may also be coupled to a user input (not shown) operable by a user of the computer 110 to enter data (i.e., the user input sources may include a mouse, a keyboard, etc.) and a display (not shown) operable to display data from the computer 110 (i.e., the display may be a CRT monitor, an LCD display panel, etc.). The computer 110 may be configured as a node (e.g., a master node or a member node) of a multi-node computing system and communicate with other nodes of that multi-node computing system through a network 126.

Figure 2:
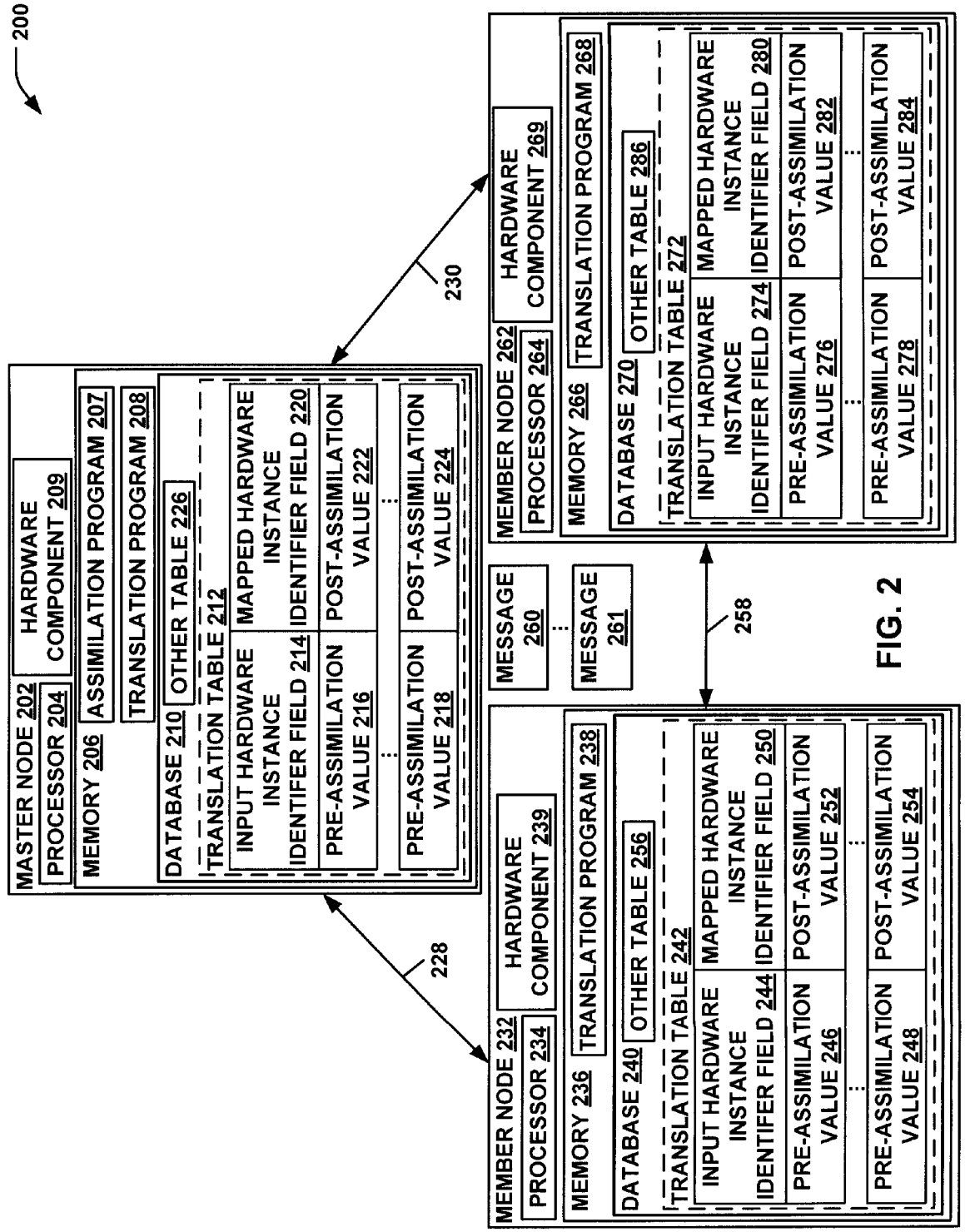
FIG. 2 illustrates a block diagram of the primary software components and hardware components of the apparatus of FIG. 1.

Turning to FIG. 2, FIG. 2 illustrates a block diagram of the primary software components and hardware components of the apparatus 100 of FIG. 1. Moreover, FIG. 2 illustrates an exemplary multi-node computing system 200 with a plurality of nodes, such as a distributed computing system. As illustrated, the plurality of nodes of the multi-node computing system 200 may include a master node 202, a member node 232, and a member node 262. The member node 232 and the member node 262 may have been assimilated into the multi-node computing system 200 by the master node 202.

Each of the nodes of the multi-node computing system 200 may be similar to the apparatus 100 of FIG. 1. Each of the nodes of the multi-node computing system 200 may be interconnected and may communicate with each other. Each of the nodes of the multi-node computing system 200 may include at least one hardware component, and each hardware component may be referenced by a hardware instance identifier. In some embodiments, the nodes of the multi-node computing system 200 may be firmware components in separate chassis, or practically any entities with individual processors and their own memories (e.g., cache or other storage) that may transition from a local only mode to a distributed mode. For simplicity, three nodes are illustrated in FIG. 2, but the multi-node computing system 200 may include more than three nodes.

Figure 6:
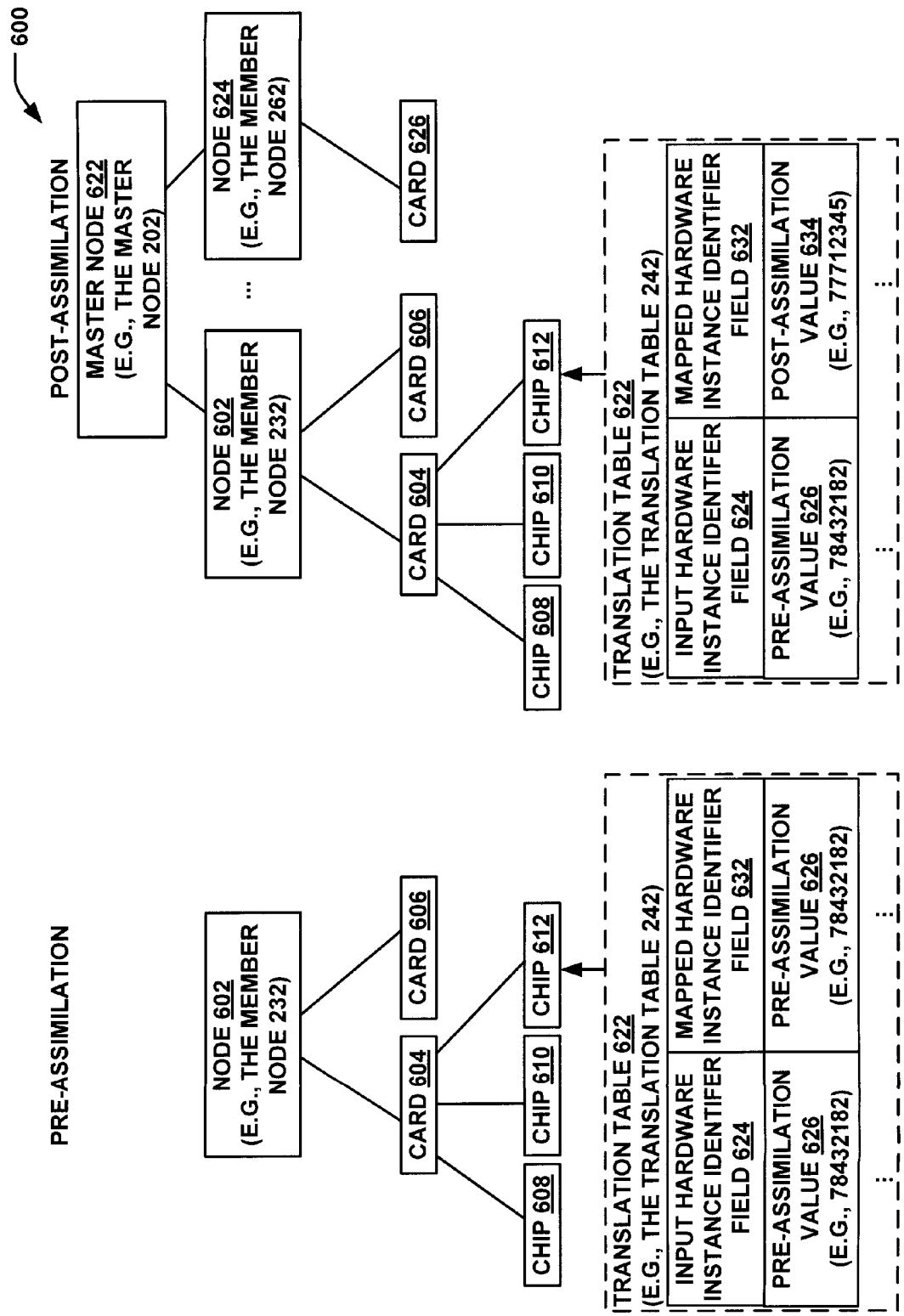
FIG. 6 is an example consistent with the embodiment of the first method of FIG. 3.

Turning to the master node 202 of FIG. 2, the master node 202 may have acquired its role as the master node through an election process. For example, any node may be elected (e.g., randomly or based on a rule) to perform the role of the master node in the multi-node computing system 200. Alternatively, any node may be designated as the master node to perform the role of the master node in the multi-node computing system 200. For example, before assimilation, a node may be aware that other nodes may exist, which may lead to a discovery process as to which other nodes are there and which node will be elected as the master node. Indeed, nodes may work independently using their local databases, and a master node may be elected or designated without disrupting nodes that started working without a master node. For simplicity, it is assumed that the master node 202 has already acquired the role of the master node. The master node 202 may have a position of first node in a tree or hierarchy (hereinafter "tree") of the multi-node computing system 200. Post-assimilation sections of FIGS. 6-7 illustrate exemplary trees.

The master node 202 may include at least one processor 204 or central processing unit (CPU) coupled with at least one memory 206. The processor 204 may be incorporated into the system processors 111, 112, 113 illustrated in FIG. 1, or into a separate processor. The memory 206 may be incorporated into the cache subsystem 114, the main storage 116, or the DASD 130 illustrated in FIG. 1, or into a separate memory. The processor 204 may be configured to execute program code stored on the memory 206, and the program code may cause the master node 202 to perform operations such as those described herein. The processor 204 performs operations during processing cycles (also referred to as "clock cycles" or "cycles.")

The memory 206 may store an assimilation program 207. The processor 204 may be configured to execute program code of the assimilation program 207 to assimilate the member nodes 232, 262 into the multi-node computing system 200. The master node 202 may assimilate nodes at different times, at about a same time, with the master node 202, without the master node 202, etc. For example, the master node 202 may assimilate the member node 232 in cycle X, but assimilate the member node 262 in cycle Y.

The master node 202 may assimilate the member nodes 232, 262 by assigning positions to the member nodes 232, 262 in the tree of the multi-node computing system 200. Assimilating the member nodes 232, 262 may also include assimilating hardware components of the member nodes 232, 262, as well as assigning positions to the hardware components in the tree of the multi-node computing system 200. For example, the master node 202 may assign positions in the tree by assigning post-assimilation values to hardware instance identifiers. In some embodiments, the master node 202 may generate a multi-node table (not shown) with substantially all hardware instance identifiers and their assigned post-assimilation values. The post-assimilation values may be sent to the member nodes 232, 262.

As an example of assimilation, connected to option A herein, the master node 202 may assimilate the member node 232 by assigning a post-assimilation value to a hardware instance identifier of a hardware component 239 of the member node 232. The master node 202 may also send the post-assimilation value to the member node 232. Specifically, if the hardware instance identifier of the hardware component 239 includes 32 bits, the post-assimilation value may be a 32 bit value. The master node 202 may assign and send a post-assimilation value equal to a 32 bit value of Y or equal to practically any value that may fit in the hardware instance identifier. Under option A, there may be no correlation between pre-assimilation values and post-assimilation values. For example, pre-assimilation values may be randomly assigned by the member nodes 232, 262 and post-assimilation values may be randomly assigned by the master node 202. Under option A, a translation table may be utilized to update pre-assimilation values with post-assimilation values.

Alternatively, as another example of assimilation, connected to option B herein, the master node 202 may assimilate the member node 232 and may assign a post-assimilation value to a node identifier portion of the hardware instance identifier of the hardware component 239 of the member node 232. The master node 202 may also send the post-assimilation value to the member node 232. Specifically, if the hardware instance identifier of the hardware component 239 includes 32 bits, and the node identifier portion is 4 bits out of the 32 bits, then the post-assimilation value may be a 4 bit value. The remaining 28 bits may be a remainder portion and may include a unique value that does not get updated in response to updating the node identifier portion. For example, the master node 202 may assign and send a post-assimilation value equal to bits "1111" or equal to practically any value that may fit in the node identifier portion of the hardware instance identifier.

Of note, under option B, the post-assimilation value may have actually been assigned by the master node 202 to the member node 232, and because the hardware component 239 belongs to the node 232, the post-assimilation value assigned by the master node 202 may be encoded in the identifier portion of the hardware instance identifier of the hardware component 239. Under option B, pre-assimilation values and post-assimilation values in node identifier portions of hardware instance identifiers may represent node identifiers or node ids. Moreover, under option B, there may be a correlation between pre-assimilation values, post-assimilation values, and node identifiers. Those of ordinary skill in the art may also appreciate that under option B, a format may be imposed for hardware instance identifiers to include both a node identifier portion and a remainder portion. Moreover, some bits of hardware instance identifiers may have to be dedicated as the node identifier portion. The node identifier portion may be practically any bits of the hardware instance identifier, such as top or leading bits. An option C is also provided and may be a combination of the option A and option B.

The master node 202 may send post-assimilation values to the member nodes 232, 262 in messages 260, 261. The master node 202 may send or receive at least one message, such as the message 260 or the message 261. The message 260 may be a response, may be a request, may be an update (e.g., a database update), may include a database query, may include a reading task (e.g., the message 260 may include a read query), may include a writing task (e.g., the message 260 may be an update), may be any combination thereof, etc. The message 260 may simply include an acknowledgement indicating whether an action was performed or not performed. Indeed, the message 260 may be practically any kind of message or inter-process communication that may be sent or received by nodes. The message 261 may be similar to the message 260.

Even though the master node 202 may be configured via execution of the assimilation program 207 to assimilate the member nodes 232, 262 and hardware components thereof, the master node 202 may also assign and update pre-assimilation values like the member nodes 232, 262. For example, the master node 202 may assign and update a pre-assimilation value (e.g., a translation program 208 with option A, B, or C) of the hardware instance identifier of the hardware component 209 with the post-assimilation value assigned by the master node 202 (e.g., via the assimilation program 207). Thus, the master node 202 may assimilate the member nodes 232, 262 and itself into the tree of the multi-node computing system 200, as well as performing translation functionality like any other node to assign and update pre-assimilation values.

In some embodiments, the master node 202 may function differently. For example, the master node may not assign and update pre-assimilation values like the member nodes 232, 262, but may simply use post-assimilation values assigned via the assimilation program 207. In some embodiments, each of the member nodes 232, 262 may include the assimilation program 207 to facilitate election or designation of another node to perform the role of the master node (e.g., if the master node 202 fails).

The memory 206 of the master node 202 may also include at least one database, such as database 210. The database 210 may be a SQL database in some embodiments. However, the database 210 may not be a SQL database in some embodiments. The database 210 may be practically any database that allows mapping and queries. Similarly, queries may be SQL queries or other types of queries depending on the embodiment. Queries may be included in messages, such as the messages 260, 261. Before assimilation, the master node 202 may operate in local only mode and operate the database 210 in local only mode. The database 210 may include at least one translation table 212 (e.g., for option A) and at least one other table 226.

In operation under option A, before assimilation, the master node 202 may execute the translation program 208 to assign pre-assimilation values 216, 218 to hardware instance identifiers of hardware components. The pre-assimilation values 216, 218 may be stored in the translation table 212 under an input hardware instance identifier field 214. Before assimilation, the translation table 212 may indicate that the pre-assimilation values 216, 218 map to the pre-assimilation values 216, 218 in corresponding spots of a mapped hardware instance identifier field 220 of the translation table 212. Assuming the master node 202 assigned pre-assimilation value 216 to the hardware instance identifier of the hardware component 209, the master node 202 may collect, store, and associate data with the pre-assimilation value 216 in its database 210, such as in the other table 226, before the master node 202 is assimilated into the multi-node computing system 200.

At some point, the master node 202 may execute the assimilation program 207 and assign post-assimilation values to hardware instance identifiers of hardware components. For example, the master node 202 may assign a post-assimilation value 222 to the hardware instance identifier of the hardware component 209.

Continuing with option A, after assimilation, the master node 202 may execute the translation program 208 to update the pre-assimilation value 216 with the post-assimilation value 222. For example, the translation table 212 may be updated to indicate that the pre-assimilation value 216 maps to the post-assimilation value 222 as illustrated. Moreover, in some embodiments, the pre-assimilation value 216 under the input hardware instance identifier field 214 may be updated with the post-assimilation value 222, and the post assimilation value 222 may also be stored under the mapped hardware instance identifier field 220. As such, the post-assimilation value 222 may map to the post-assimilation value 222. By doing so, substantially same code may therefore be utilized both before and after assimilation to update pre-assimilation values with post-assimilation using the translation table 212. The mapping of other pre-assimilation values, such as the pre-assimilation value 218, may be updated as appropriate for another hardware component, such as, indicating that the pre-assimilation value 218 maps to a post-assimilation value 224.

In operation under option B, before assimilation, the master node 202 may execute the translation program 208 to assign and encode a pre-assimilation value in a node identifier portion of the hardware instance identifier of the hardware component 209. After assimilation, the master node 202 may execute the translation program 208 to update pre-assimilation values by encoding the post-assimilation values received from the master node 202 (albeit an internal receipt within the master node 202). For example, the master node 202 may encode a post-assimilation value in the node identifier portion of the hardware instance identifier of the hardware component 209. The translation table 212 may not be utilized with option B.

Both under option A and B, after assimilation, the master node 202 may execute the translation program 208 to search for references in the other table 226 or queries to the database 210 and update pre-assimilation values with post assimilation values. After the master node 202 has updated pre-assimilation values with post-assimilation values, the master node 202 may switch from the local only mode to a distributed mode. Moreover, the master node 202 may operate the database 210 as a distributed database, or master copy, for the multi-node computing system 200. Indeed, the master node 202 may receive and merge data of databases 240, 270 of the member nodes 232, 262 with the database 210 in distributed mode. After the member nodes 232, 262 send data of the databases 240, 270 to the master node 202, the member nodes 232, 262 may also switch from a local only mode to a distributed mode.

The master node 202 may be solely configured to update the database 210 in distributed mode to ensure an accurate master copy. Updates may include deletions to the database 210, insertions to the database 210, or other modifications to the database 210. Requests (e.g., via messages 260, 261) to update the database 210 in distributed may be received by the master node 202 from the member nodes 232, 262. The master node 202 may also be configured to send updates (e.g., via messages 260, 261) from the database 210 in distributed mode to the member nodes 232, 262. Indeed, information on the master node 202 may likely be the newest or closest to real-time in the multi-node computing system 200, and the databases 240, 270 of the member nodes 232, 262 may be synchronized with updates from the database 210 sent by the master node 202 to the member nodes 232, 262. The master node 202 may be seamlessly available throughout its transition from the local only mode to the distributed mode.

Turning to the member nodes 232, 262 of FIG. 2, these nodes may be similar to the master node 202. The member nodes 232, 262 and the master node 202 may engage in bidirectional communication, as illustrated by connections 228, 230. For example, the member nodes 232, 262 may be coupled (e.g., wirelessly or wired) with the master node 202 in a manner that enables the member nodes 232, 262 to receive messages (e.g., the messages 260, 261) from the master node 202, as well as in a manner that enables the member nodes 232, 262 to send the messages 260, 261 to the master node 202. Similarly, as illustrated by connection 258, the member node 232 may be coupled (e.g., wirelessly or wired) with the member node 262 in a manner that enables the member node 232 to receive the messages 260, 261 from the member node 262, as well as in a manner that enables the member node 232 to send the messages 260, 261 to the member node 262, and vice versa.

In particular, each of the member nodes 232, 262 may include at least one processor 234, 264 or central processing unit (CPU) coupled with at least one memory 236, 266. The processors 234, 264 may be incorporated into the system processors 111, 112, 113 illustrated in FIG. 1, or into a separate processor. The memories 236, 266 may be incorporated into the cache subsystem 114, the main storage 116, or the DASD 130 illustrated in FIG. 1, or into a separate memory. The processors 234, 264 may be configured to execute program code stored on the memories 236, 266, and the program code may cause the member nodes 232, 262 to perform operations such as those described herein. The processors 234, 264 perform operations during processing cycles.

The memories 236, 266 may or may not store an assimilation program similar to the assimilation program 207. Nonetheless, the master node 202 may assimilate the member nodes 232, 262 by assigning positions to the member nodes 232, 262 in the tree of the multi-node computing system 200. Assimilating the member nodes 232, 262 may also include assimilating hardware components of the member nodes 232, 262 and assigning positions to the hardware components in the tree of the multi-node computing system 200. For example, the master node 202 may assign positions in the tree by assigning post-assimilation values to hardware instance identifiers as discussed herein.

The memories 236, 266 may also include at least one database, such as database 240 in the member node 232 and the database 270 in the member node 262. The databases 240, 270 may be SQL databases in some embodiments. However, the databases 240, 270 may not be SQL databases in some embodiments. The databases 240, 270 may be practically any database that allows mapping and queries. Similarly, queries may or may not be SQL queries and may be included in messages, such as the messages 260, 261. Before assimilation, the member nodes 232, 262 may operate in local only mode and operate the databases 240, 270 in local only mode. The databases 240, 270 may include at least one translation table 242 (e.g., for option A) and at least one other table 256 in the member node 232 and at least one translation table 272 (e.g., for option A) and at least one other table 286 in the member node 262.

In operation under option A, before assimilation, the member nodes 232, 262 may execute the translation programs 238, 268 to assign pre-assimilation values 246, 248, 276, 278 to hardware instance identifiers of hardware components. The pre-assimilation values 246, 248, 276, 278 may be stored in the translation tables 242, 272 under input hardware instance identifier fields 244, 274. Before assimilation, the translation tables 242, 272 may indicate that the pre-assimilation values 246, 248, 276, 278 map to the pre-assimilation values 246, 248, 276, 278 in corresponding spots of mapped hardware instance identifier fields 250, 280 of the translation tables 242, 272. Assuming the member nodes 232, 262 assigned pre-assimilation values 246, 276 to the hardware instance identifiers of the hardware components 239, 269, the member nodes 232, 262 may collect, store, and associate data with the pre-assimilation value 246, 276 in their databases 240, 270, such as in the other tables 256, 286, before the member nodes 232, 262 are assimilated into the multi-node computing system 200.

At some point, the master node 202 may execute the assimilation program 207 and assign post-assimilation values to hardware instance identifiers of hardware components. For example, the master node 202 may assign post-assimilation values 252, 282 to the hardware instance identifiers of the hardware components 239, 269.

Continuing with option A, after assimilation, the member nodes 232, 262 may execute the translation programs 242, 272 to update the pre-assimilation values 246, 276 with the post-assimilation values 252, 282. For example, the translation tables 242, 272 may be updated to indicate that the pre-assimilation values 246, 276 map to the post-assimilation values 252, 282 as illustrated. Moreover, in some embodiments, the pre-assimilation values 246, 276 under the input hardware instance identifier fields 244, 274 may be updated with the post-assimilation values 252, 282, and the post assimilation values 252, 282 may also be stored under the mapped hardware instance identifier fields 250, 280. As such, the post-assimilation values 252, 282 may map to the post-assimilation values 252, 282. By doing so, substantially same code may therefore be utilized both before and after assimilation to update pre-assimilation values with post-assimilation using the translation tables 242, 272. The mapping of other pre-assimilation values, such as the pre-assimilation values 248, 278, may be updated as appropriate for another hardware component, such as, indicating that the pre-assimilation values 248, 278 map to post-assimilation values 254, 284.

In operation under option B, before assimilation, the member nodes 232, 262 may execute the translation programs 238, 268 to assign and encode pre-assimilation values in node identifier portions of the hardware instance identifiers of the hardware components 239, 269. After assimilation, the member nodes 232, 262 may execute the translation programs 238, 268 to update pre-assimilation values by encoding the post-assimilation values received from the master node 202. The translation tables 242, 272 may not be utilized with option B.

Both under option A and B, after assimilation, the member nodes 232, 262 may execute the translation programs 238, 268 to search for references in the other tables 256, 286 or queries to the database 240, 270 and update pre-assimilation values with post assimilation values. After the member nodes 232, 262 have updated pre-assimilation values with post-assimilation values, the member nodes 232, 262 may send data of the databases 240, 270 to the master node 202, the member nodes 232, 262 may also switch from a local only mode to a distributed mode. Requests (e.g., via messages 260, 261) to update the database 210 may be received by the master node 202 from the member nodes 232, 262. The databases 240, 270 of the member nodes 232, 262 may be synchronized with updates from the database 210 sent by the master node 202 to the member nodes 232, 262. The member node 232, 262 may be seamlessly available throughout their transition from the local only mode to the distributed mode.

Of note, those of ordinary skill in the art may appreciate that each of the databases 210, 240, 270 may be thought of as including several parts. The first part may be a hierarchical definition of a maximum configuration that the overall multi-node computing system 200 (composed of several nodes) may have. As such, each node may contain information about substantially all hardware components which may be contained within each node (e.g., communication ports, chips, etc.). The second part may be a pre-assimilation definition (e.g., pseudo-node definition) that represents a node in local only mode in the overall hierarchy (e.g., via pre-assimilation values). The third part may be a series of tables that stores information (e.g., VPD, hardware state, etc.) about individual hardware members of the multi-node computing system 200. These tables may have associations with the pre-assimilation definition via hardware instance identifiers. Indeed, the pre-assimilation definition may be a hardware definition. As such, each node, both before and after assimilation, may include hardware instance identifiers for substantially a maximum configuration of hardware components possible in the multi-node computing system 200, and each hardware instance identifier may initially be assigned a pre-assimilation value that is subsequently updated with a post-assimilation value.

Moreover, in some embodiments, nodes may assign pre-assimilation values to hardware instance identifiers of hardware components of other nodes. For simplicity, the discussion of FIG. 2 described how the master node 202, the member node 232, and the member node 262 may assign pre-assimilation values to hardware instance identifiers or to node identifier portions of hardware instance identifiers for hardware components of the master node 202, the member node 232, and the member node 262. However, the master node 202, the member node 232, and the member node 262 may assign pre-assimilation values for each other's hardware components as each of the master node 202, the member node 232, and the member node 262 may include a substantially maximum configuration. For example, the member node 232 may assign a pre-assimilation value of "4567890" to the hardware instance identifier of the hardware component 269 of the member node 262 and stored the pre-assimilation value of "4567890" in the translation table 242 (e.g., under the option A). Moreover, pre-assimilation values of hardware instance identifiers of hardware components of other nodes may be updated like any other pre-assimilation values as described herein.

Furthermore, nodes may assign different pre-assimilation values. For example, while the member node 232 may assign the pre-assimilation value of "4567890" to the hardware instance identifier of the hardware component 269 of the member node 262 within the member node 232, the member node 262 may assign a pre-assimilation value of "9027490" within the member node 262. And, each of the member nodes 232, 262 may update the pre-assimilation values they assigned with a post-assimilation value received from the master node 202. Thus, each node may assign its own pre-assimilation value. Indeed, those of ordinary skill in the art may appreciate that a pre-assimilation value may be used internally by the node that assigned the pre-assimilation value during the local only mode. And by the time the node switches to distributed mode, for example, substantially all pre-assimilation values within the node may have been updated to post-assimilation values via a translation program (e.g., option A, option B, or option C). Indeed, post-assimilation values, not pre-assimilation values, may be used outside of a node (e.g., when communicating with another node). Moreover, practically every node of the multi-node computing system 200 may use post-assimilation values assigned by the master node 202.

Figure 3:
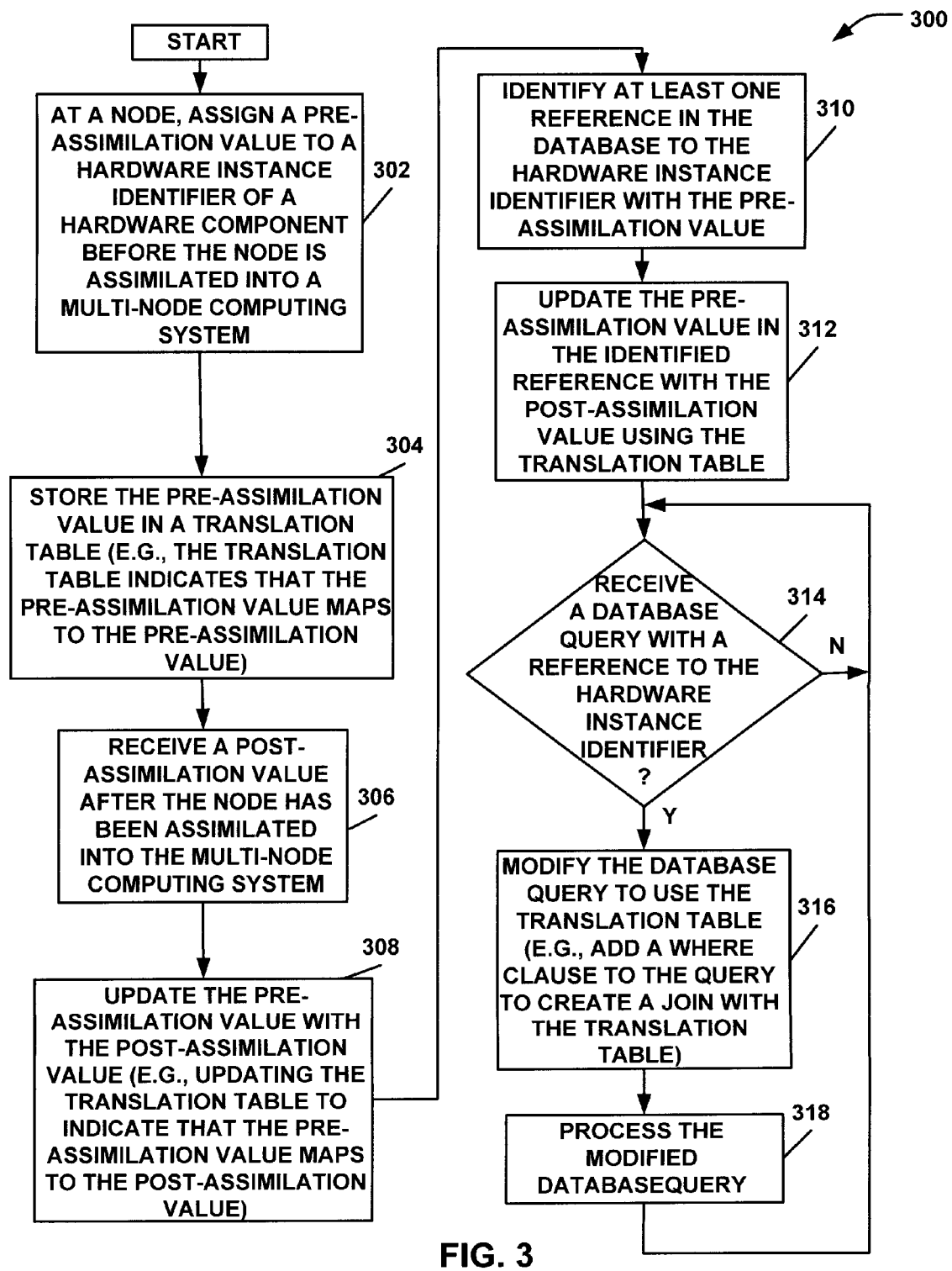
FIG. 3 is a flowchart of an embodiment of a first method of managing a database using the apparatus of FIGS. 1-2.

Turning to FIG. 3, FIG. 3 is a flowchart 300 of an embodiment of a first method of managing a database using the apparatus of FIGS. 1-2. The flowchart 300 may be executed via the translation programs 208, 238, 268 by the master node 202, the member node 232, the member node 262, or practically any node. More specifically, a database layer of the master node 202, the member node 232, the member node 262, or practically any node may execute the flowchart 300. The flowchart 300 may be executed for substantially every hardware component (e.g., the hardware components 209, 239, 269). As discussed hereinabove, each node may include hardware instance identifiers for substantially a maximum configuration of hardware components, and each hardware instance identifier may initially be assigned a pre-assimilation value that is subsequently updated with a post-assimilation value. The flowchart 300 is connected to the option A discussed herein. FIG. 2 will be referenced throughout the discussion of FIG. 3.

At 302, a node may assign a pre-assimilation value to a hardware instance identifier of a hardware component before the node is assimilated into a multi-node computing system. For example, the member node 232 may assign the pre-assimilation value 246 to a hardware instance identifier of the hardware component 239 before the member node 232 is assimilated into the multi-node computing system 200.

At 304, the node may store the pre-assimilation value in a translation table. The translation table may indicate that the pre-assimilation value maps to the pre-assimilation value. For example, the member node 232 may store the pre-assimilation value 246 in the translation table 242 under the hardware instance identifier field 244. Moreover, before assimilation, the pre-assimilation value 246 may map to the pre-assimilation value 246 under the mapped hardware instance identifier field 250.

At 306, the node may receive a post-assimilation value after the node has been assimilated into the multi-node computing system. The node may receive the post-assimilation value from a master node of the multi-node computing system. For example, the member node 232 may receive the post-assimilation value 252 after the member node 232 has been assimilated into the multi-node computing system 200 from the master node 202.

At 308, the node may update the pre-assimilation value with the post-assimilation value. The node may store the post-assimilation value in the translation table. The node may update the translation table to indicate that the pre-assimilation value maps to the post-assimilation value. The translation table may indicate that the pre-assimilation value maps to the pre-assimilation value before updating the translation table to indicate that the pre-assimilation value maps to the post-assimilation value. For example, the member node 232 may update the pre-assimilation value 246 with the post-assimilation value 252. Indeed, the member node 232 may stored the post-assimilation value 252 under the mapped hardware instance identifier field 250 in an appropriate spot and update the translation table 238 to indicate that the pre-assimilation value 246 maps to the post-assimilation value 252. The translation table 238 may indicate that the pre-assimilation value 246 maps to the pre-assimilation value 246 under the mapped hardware instance identifier field 250 before updating the translation table 242 to indicate that the pre-assimilation value 246 maps to the post-assimilation value 246.

In some embodiments, the pre-assimilation value 246 in the input hardware instance identifier field 244 may be updated with the post-assimilation value 252 and the post assimilation value 252 may also be under the mapped hardware instance identifier field 250. As such, the post-assimilation value 252 may map to the post-assimilation value 252.

At 310, the node may identify at least one reference in a database to the hardware instance identifier with the pre-assimilation value. For example, the member node 232 may identify at least one reference in the database 240, such as in the other table 256, to the hardware instance identifier with the pre-assimilation value 246. The reference may be to a source and a destination, and the source includes the hardware instance identifier with the pre-assimilation value 246.

At 312, the node may update the pre-assimilation value in the identified reference with the post-assimilation value using the translation table. For example, the member node 232 use the translation table 242 to determine that the pre-assimilation value 246 maps to the post-assimilation value 252, and the member node 232 may update the pre-assimilation value 246 in the identified reference with the post-assimilation value 252.

At 314, the node may determine whether it has received a database query with a reference to the hardware instance identifier. For example, the member node 232 may determine whether it has received a database query with a reference to the hardware instance identifier of the hardware component 239. Indeed, the member node 232 may internally receive such a database query. Where the member node 232 does not receive the database query, control may remain at 314 to continue to monitor for such database queries. Where the member node 232 receives the database query, control may pass to 316. The member node 232 may receive the database query from an application layer of the member node 232.

At 316, the node may modify the database query to use the translation table. In particular, the node may modify the database query to add a where clause to the database query to create a join with the translation table. For example, the member node 232 may modify the received database query referencing the hardware instance identifier to use the translation table 242 by adding a where clause to the received database query to create a join with the translation table 242.

At 318, the node may process the modified database query. For example, the member node 232 may process the modified database query as appropriate with the database 240, according to the translation table 242, and control may pass to 314 to monitor for additional database queries.

Thus, those of ordinary skill in the art may appreciate that a pre-assimilation value may be updated with a post-assimilation value in a variety of ways. Moreover, those of ordinary skill in the art may appreciate that option A may rely on a hardware instance ID mapping table (e.g., the translation table 212). With the hardware instance ID mapping table approach, at a node, a map table may be created in a database which may contain two fields, the "input" hardware instance ID field (e.g., the input hardware instance identifier field 244) and its "mapped" hardware instance ID (e.g., the mapped hardware instance identifier field 250). For example, in some embodiments, the map table may initially include substantially all pseudo-node hardware instance ids (e.g., at the node 232) and substantially all multi-node instance ids (e.g., at the master node 202) mapped to the same value (e.g., pre-assimilation values) as the input hardware instance ID. Once the node is assigned its position in the overall hierarchy of the multi-node computing system, the mapped values in the map table for the pseudo-node hardware instance ids may be updated (e.g., with post-assimilation values) to point at the correct hardware instance ID in a multi-node table (e.g., of the master node 202). Moreover, substantially all of SQL statements that are used to access any part of the database may contain a join of the mapping table to perform any mapping of "input" hardware instance ids and "mapped" hardware instance ids.

Indeed, those of ordinary skill in the art may also appreciate that option A may be advantageous because program code that obtained a hardware instance ID while operating in local only mode before assimilation may automatically continue to work post-assimilation (e.g., in local only mode after assimilation or even in distributed mode). For example, if a node started associating data before assimilated, the node may continue to operate without knowing that seamlessly a hardware instance identifier simply maps to a post-assimilation value instead of a pre-assimilation value. Moreover, option A may also be advantageous because it may include little to no logic processing as substantially same program code may be utilized pre-assimilation and post-assimilation, which may reduce logic and processing requirements for each node. For example, an application layer of a node may send a request or other message to the node, a database layer of the node may be called to modify the request to use the translation table, and process the modified request for substantially every query received at the node both pre-assimilation and post-assimilation. Moreover, option A may be performed "under the covers." However, those of ordinary skill in the art may also appreciate that using a translation table substantially each time (e.g., a query is received via a join with the translation table) may lead to a slight performance hit.

Figure 4:
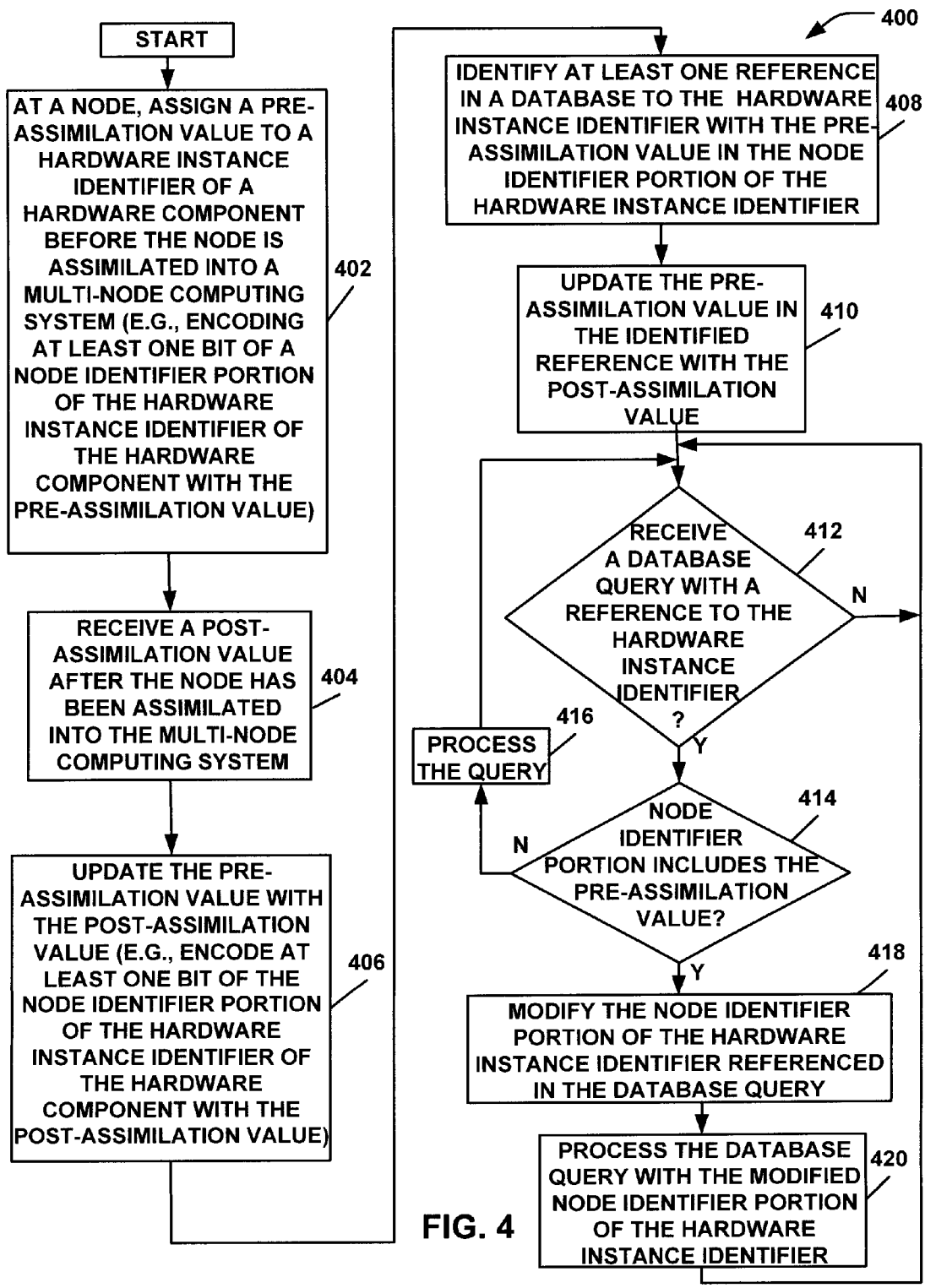
FIG. 4 is a flowchart of an embodiment of a second method of managing a database using the apparatus of FIGS. 1-2.

Turning to FIG. 4, FIG. 4 is a flowchart 400 of an embodiment of a second method of managing a database using the apparatus of FIGS. 1-2. The flowchart 400 may be executed via the translation programs 208, 238, 268 by the master node 202, the member node 232, the member node 262, or practically any node. More specifically, a database layer of the master node 202, the member node 232, the member node 262, or practically any node may execute the flowchart 400. The flowchart 400 may be executed for substantially every hardware component (e.g., the hardware components 209, 239, 269). Indeed, each node may include hardware instance identifiers for substantially a maximum configuration of hardware components, and each hardware instance identifier may initially be assigned a pre-assimilation value that is subsequently updated with a post-assimilation value. The flowchart 400 is connected to the option B discussed herein. FIG. 2 will be referenced throughout the discussion of FIG. 4.

At 402, a node may assign a pre-assimilation value to a hardware instance identifier of a hardware component before the node is assimilated into a multi-node computing system. The node may assign the pre-assimilation value by encoding at least one bit of a node identifier portion of the hardware instance identifier of the hardware component with the pre-assimilation value. For example, the member node 232 may assign a pre-assimilation value by encoding at least one bit of a node identifier portion of the hardware instance identifier of the hardware component 239 before the member node 232 is assimilated into the multi-node computing system 200.

At 404, the node may receive a post-assimilation value after the node has been assimilated into the multi-node computing system. The node may receive the post-assimilation value from a master node of the multi-node computing system. For example, the member node 232 may receive the post-assimilation value after the member node 232 has been assimilated into the multi-node computing system 200 from the master node 202.

At 406, the node may update the pre-assimilation value with the post-assimilation value. The node may update the pre-assimilation value by encoding at least one bit of the node identifier portion of the hardware instance identifier of the hardware component with the post-assimilation value. For example, the member node 232 may update the pre-assimilation value with the post-assimilation value encoding at least one bit of the node identifier portion with the post-assimilation value. Of note, the post-assimilation encoded into the identifier portion may have been assigned by the master node 202 to whichever node contains the hardware component. In this case, the post-assimilation value may have been assigned by the master node 202 to the node 232 and because the hardware component 239 belongs to the node 232, the post-assimilation value assigned by the master node 202 may also be encoded in the identifier portion of the hardware instance identifier of the hardware component 239. As such, there may be a correlation. Of note, as option B may use a correlation, another node identifier portion of another hardware instance identifier of another hardware component may be updated with the post-assimilation value as long as the other hardware component is also a child of the same node as the hardware component 239. The hardware instance identifier of the hardware component 239 may also include a remainder portion in addition to the node identifier portion. The remainder portion of the hardware instance identifier of the hardware component 239 may not be updated in response to encoding the at least one bit of the node identifier portion with the post-assimilation value.

At 408, the node may identify at least one reference in a database to the hardware instance identifier with the pre-assimilation value in the node identifier portion of the hardware instance identifier. For example, the member node 232 may identify at least one reference in the database 240, such as in the other table 256, to the hardware instance identifier of the hardware component 239 with the pre-assimilation value in the node identifier portion.

At 410, the node may update the pre-assimilation value in the identified reference with the post-assimilation value. For example, the member node 232 may update the pre-assimilation value in the identified reference with the post-assimilation value. The remainder portion of the hardware instance identifier of the hardware component 239 may not be updated in response to encoding the at least one bit of the node identifier portion with the post-assimilation value.

At 412, the node may determine whether it has received a database query with a reference to the hardware instance identifier. For example, the member node 232 may determine whether it has received a database query with a reference to the hardware instance identifier of the hardware component 239. Indeed, the member node 232 may internally receive such a database query. Where the member node 232 does not receive the database query, control may remain at 412 to continue to monitor for such database queries. Where the member node 232 receives the database query, control may pass to 414. The member node 232 may receive the database query from an application layer of the member node 232.

At 414, the node may determine whether the node identifier portion includes the pre-assimilation value. For example, the member node 232 may determine whether the node identifier portion of the hardware instance identifier of the hardware component 239 referenced in the database query includes the pre-assimilation value. Where the node identifier portion does not include the pre-assimilation value, for example, and instead already includes the post-assimilation value, the database query may be processed at 416. For example, the member node 232 may process the database query without changes as appropriate with the database 240. Where the node identifier does include the pre-assimilation value, at 418, the node may modify the node identifier portion of the hardware instance identifier referenced in the database query. For example, the member node 232 may modify the node identifier portion of the hardware instance identifier referenced in the database query, instead of the modifying the database query as in FIG. 3, by updating the pre-assimilation value with the post-assimilation value. Updating may include encoding at least one bit of the node identifier portion of the hardware instance identifier of the hardware component 239 with the post-assimilation value. The hardware instance identifier with the node portion encoded with the post-assimilation value may be stored in the database 240, similar to 410.

At 420, the node may process the database query with the modified node identifier portion of the hardware instance identifier. For example, the member node 232 may process the database query with the modified node identifier portion of the hardware instance identifier as appropriate with the database 240, and control may pass to 412 to monitor for additional database queries.

Thus, those of ordinary skill in the art may appreciate that a pre-assimilation value may be updated with a post-assimilation value in a variety of ways. Moreover, those of ordinary skill in the art may appreciate that option B may rely on hardware instance ID bit encoding (e.g., in the node identifier portion). With the hardware instance ID bit encoding approach, a set of bits of the hardware instance ID may represent the node that the hardware component belongs to. The pseudo node (e.g., pre-assimilation node) may be represented with a special value such as 0xFFFF while the node bits of the multi-node hardware instance ids (e.g., post-assimilation) may be 0x0000 for the first node, 0x0001 for the second, etc. (e.g., per the master node). Other nid bits (e.g., remainder portion) may represent a unique hardware instance within the node. For example, the first Ethernet port on a node may be represented by the value 0xE001 in the remainder portion. The overall hardware instance ID of the first Ethernet port in the pseudo node would be 0xFFFFE001 (e.g., pre-assimilation) and the hardware instance ID of the first Ethernet port of the first node in the multi-node table would be 0x0000E001 (e.g., post-assimilation). When the master node informs a node of its position in the overall hierarchy, the node may scan its database for references to hardware instance ids that has node bits (e.g., in a node identifier portion) equal to 0xFFFF and may update them to the proper node value (e.g., post-assimilation value). Also, database API code may handle ids that were obtained in local only mode even after switching into distributed mode by checking, for example, the high bits of the hardware instance ID (e.g., the node identifier portion). If the node bits were 0xFFFF, the API code may then overwrite the node bits (e.g., in the node identifier portion) to be the correct node before building SQL to perform a database operation.

Indeed, those of ordinary skill in the art may also appreciate that option B may be advantageous in that use of a translation table, such as the translation tables 212, 242, 272, may be avoided. Furthermore, an extra join in SQL with a translation table may also be avoided. Moreover, for a database query, for example, a node identifier portion may be modified by updating a pre-assimilation value with a post-assimilation value a single time (e.g., in connection with 414, 418, 420 of FIG. 4) because the post-assimilation value may be stored, which in turn may result in no need to try to translate an already updated node identifier portion, and a sender (e.g., application internal to the node) of the database query may become aware of the update. For example, if a client application of the node sends a request with a database query with a node identifier portion having an encoded pre-assimilation value, the node may update by encoding a post-assimilation value, the hardware instance identifier with the node portion encoded with the post-assimilation value may be stored (e.g., in the database), and the database query may be run with the encoded post-assimilation value. Next time it comes in, the database query may include the node identifier portion with the encoded post-assimilation value due to the first update, and the node may not have to continuously encode the post-assimilation value (as the hardware instance identifier with the node portion encoded with the post-assimilation value may have been stored the first time it is used).

However, those of ordinary skill in the art may also appreciate that under option B, a format may be imposed for hardware instance identifiers to include both a node identifier portion and a remainder portion. Moreover, some bits of hardware instance identifiers may have to be dedicated as the node identifier portion. Option B may also not be "under the covers," and may rely on more logic and decision making than option A.

Figure 5:
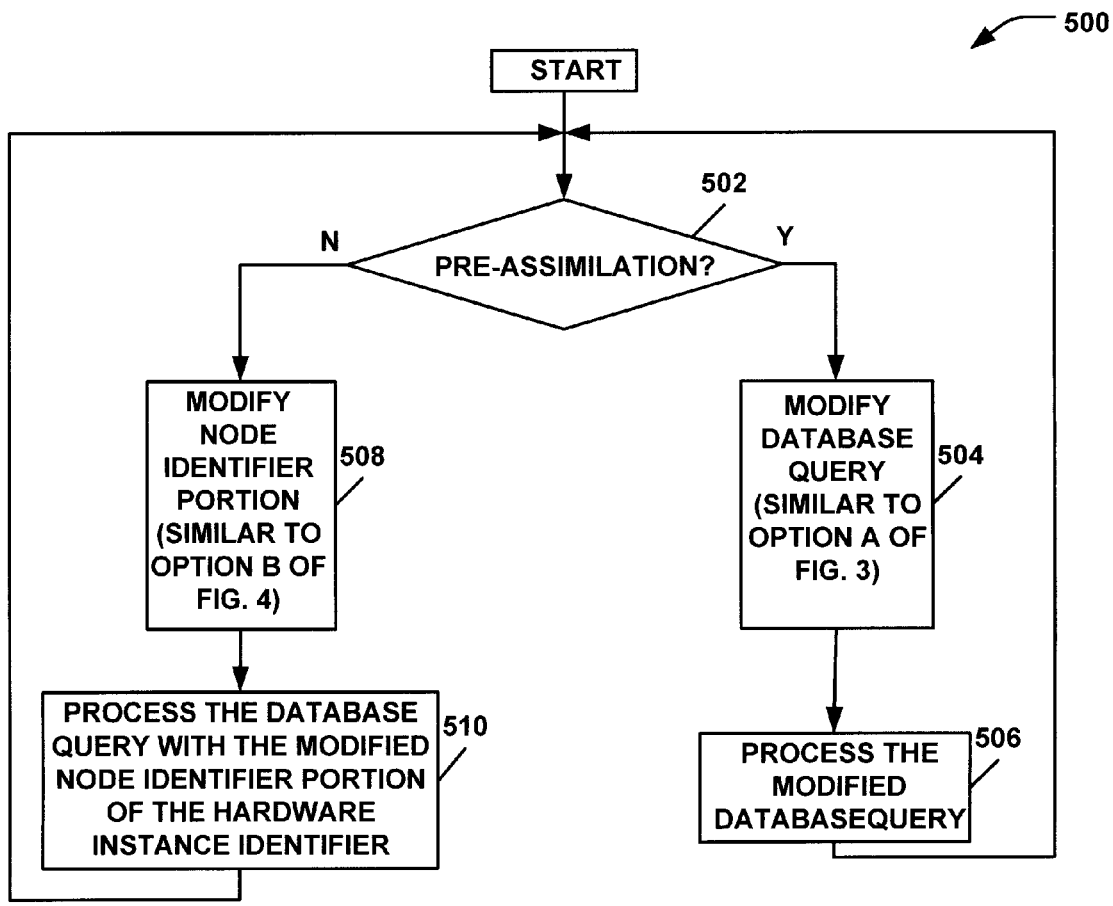
FIG. 5 is a flowchart of an embodiment of a third method of managing a database using the apparatus of FIGS. 1-2.

Turning to FIG. 5, FIG. 5 is a flowchart 500 of an embodiment of a third method of managing a database using the apparatus of FIGS. 1-2. The flowchart 500 may be executed via the translation programs 208, 238, 268 by the master node 202, the member node 232, the member node 262, or practically any node. More specifically, a database layer of the master node 202, the member node 232, the member node 262, or practically any node may execute the flowchart 500. The flowchart 500 may be executed for substantially every hardware component (e.g., the hardware components 209, 239, 269). The flowchart 500 is connected to the option C discussed herein. FIGS. 2-4 will be referenced throughout the discussion of FIG. 5.

At 502, the node may determine whether it is in a pre-assimilation state. Indeed, the node may update a pre-assimilation value with a post-assimilation value responsive to whether the node is in the pre-assimilation state. For example, the member node 232 may track whether it has been assimilated or not by the master node 202, may determine whether it is in a pre-assimilation state, and control may pass to 504 in response to determining that it is in a pre-assimilation state. Where the node is still in a pre-assimilation state, the node may modify a database query that it receives as explained in connection with 314, 316, and 318 of FIG. 3. In some embodiments, instead of determining whether the node is in a pre-assimilation state, the node may determine whether it is in a local only mode.

At 504, the node may modify the database query to use the translation table in a similar manner to option A of FIG. 3. The node may modify the database query to add a where clause to the database query to create a join with the translation table. For example, the member node 232 may modify the received database query referencing the hardware instance identifier to use the translation table 242 by adding a where clause to the received database query to create a join with the translation table 242. At 506, the node may process the modified database query. For example, the member node 232 may process the modified database query as appropriate with the database 240, according to the translation table 242, and control may pass to 502.

Returning to 502, where the node is not in a pre-assimilation state, and therefore may be in a post-assimilation state, the node may modify a node identifier portion for a database query that it receives as explained in connection with 412-420 of FIG. 4. For example, the member node 232 may track whether it has been assimilated or not by the master node 202, may determine whether it is in a pre-assimilation state, and control may pass to 508 in response to determining that it is not in a pre-assimilation state.

At 508, the node may modify the node identifier portion of the hardware instance identifier referenced in the database query in a similar manner to option B of FIG. 4. For example, the member node 232 may modify the node identifier portion of the hardware instance identifier referenced in the database query, instead of the modifying the database query as in 504, 506 and FIG. 3, by updating the pre-assimilation value with the post-assimilation value. Updating may include encoding at least one bit of the node identifier portion of the hardware instance identifier with the post-assimilation value.

At 510, the node may process the database query with the modified node identifier portion of the hardware instance identifier. For example, the member node 232 may process the database query with the modified node identifier portion of the hardware instance identifier as appropriate with the database 240, and control may pass to 502.

Those of ordinary skill may appreciate that the flowchart 500 of FIG. 5 may be a hybrid approach of the hardware instance ID mapping table approach of FIG. 3 (e.g., option A) and the hardware instance ID bit encoding approach of FIG. 4 (e.g., option B). The translation table may still be used, as in option A, and the instance ID bit encoding may be used as in option B. Indeed, in some embodiments, this hybrid of option C may make updates to the mapping table (e.g., the translation table) easier by allowing a single SQL operation to update high order bits of the "mapped" values that are for a pseudo node (e.g., pre-assimilation node) to the new multi-node value (e.g., post-assimilation value). Of note, although the flowchart 500 is related to database queries, FIG. 5 may include other items of the flowchart 300 of FIG. 3 and/or the flowchart 400 of FIG. 4 as appropriate.

Indeed, those of ordinary skill in the art may also appreciate that option C may be advantageous in that the node may access the translation table if the node is in a pre-assimilation state. Moreover, if the node is in a post-assimilation state (or for example, in a distributed mode), the node identifier portion of the hardware instance identifier may be modified once (i.e., first use). In some embodiments, option C's performance may be better than that of option A and option B.

Turning to FIG. 6, FIG. 6 is an example consistent with the embodiment of the first method of managing the database of FIG. 3, also referred to herein as option A. FIG. 6 is divided between pre-assimilation and post-assimilation sections and will refer to FIG. 2. Turning first to the pre-assimilation section, there may be a node 602 (e.g., a pseudo or pre-assimilation node) that has not been assimilated into a multi-node computing system. For example, the node 602 may be similar to the member node 232 of FIG. 2 before assimilation. The node 602 may include a variety of hardware components, such as a card 604, a card 606, a chip 608, a chip 610, and a chip 612.

The node 602 may begin working and using hardware instance identifiers of the cards 604, 606 and the chips 608, 610, 612 by assigning pre-assimilation values to hardware instance identifiers of the cards 604, 606 and the chips 608, 610, 612. The pre-assimilation values assigned by the node 602 may be stored in an input hardware instance identifier field 624 of a translation table 622. The translation table may be similar to the translation table 242. The pre-assimilation values under the input hardware instance identifier field 624 may map to the pre-assimilation values under a mapped hardware instance identifier field 632. Specifically, the hardware instance identifier of the chip 612 may be assigned a pre-assimilation value 626 equal to 78432182 by the node 602. The pre-assimilation value 626 maps to the pre-assimilation value 626, as illustrated in the translation table 622. As such, the node 602 may use the hardware instance identifier with the pre-assimilation value 626 when collecting, storing, and associating data related to the chip 612.

Turning to the post-assimilation section, this section illustrates a tree or hierarchy of a multi-node computing system (e.g., the multi-node computing system 200) showing a master node 622 (e.g., similar to the master node 202 of FIG. 2). The master node 622 has assimilated the node 602, the cards 604, 606 of the node 602, and the chips 608, 610, 612 of the card 604 of the node 602. The master node 622 may also assimilate more nodes, such as a node 624 (e.g., similar to the member node 262 of FIG. 2) and a card 626 of the node 624. The master node 622 may assign a post-assimilation value to each of these. Indeed, the master node 622 may assign a post-assimilation value to each of the node 602, the card 604, the card 606, the chip 608, the chip 610, and the chip 612. For example, the master node 622 may assign a post-assimilation value equal to 77712345 to the hardware instance identifier of the chip 612, and send the post-assimilation value equal to 77712345 to the node 602. In response, the node 602 may update its translation table 622 to indicate that the pre-assimilation value 626 equal to 78432182 maps to the post-assimilation value 634 equal to 77712345. The translation table 622 may be updated in a similar manner for each of the cards 604, 606 and chips 608, 610. Moreover, the translation table 622 may be used for references in a database and/or a query of node 602 as described herein.

Turning to FIG. 7, FIG. 7 is an example consistent with the embodiment of the second method of managing the database of FIG. 4, also referred to herein as option B. FIG. 7 is similar to FIG. 6 in many respects and like numbers denote similarities. In FIG. 7, the node 602 may begin working and using hardware instance identifiers of the cards 604, 606 and the chips 608, 610, 612 by assigning pre-assimilation values to node identifier portions of the hardware instance identifiers of the cards 604, 606 and the chips 608, 610, 612. For example, the node 602 may assign itself a pre-assimilation value equal to "0000," and each of the cards 604, 606 and the chips 608, 610, 612 may be assigned a pre-assimilation value equal to "0000" because the cards 604, 606 and the chips 608, 610, 612 of the cards 604 are each hardware components of the node 602. Thus, the pre-assimilation value equal to "0000" may be encoded in the node identifier portions of each of the hardware instance identifiers of the cards 604, 606 and the chips 608, 610, 612. Specifically, bits of a node identifier portion 704 may be encoded to equal the pre-assimilation value 706 of "0000" in the hardware instance identifier 702 of the chip 612. The hardware instance identifier 702 may also include a remainder portion 708, which may be some unique bits (e.g., from the maximum configuration known by the node 602). As such, the node 602 may use the hardware instance identifier 702 when collecting, storing, and associating data related to the chip 612.

Turning to the post-assimilation section, this section illustrates the tree or hierarchy of a multi-node computing system (e.g., the multi-node computing system 200) showing the master node 622. The master node 622 has assimilated the node 602, the cards 604, 606 of the node 602, and the chips 608, 610, 612 of the node 602. The master node 622 may also assimilate more nodes, such as the node 624 and the card 626 of the node 624. The master node 622 may assign a post-assimilation value to the node 602 and another post-assimilation value to the node 624. The master node 622 assigned a post-assimilation value equal to "0001" to the node 602, and may send the post-assimilation value equal to "0001" to the member node 232. In response, bits of the node identifier portion 704 may be encoded to equal the post-assimilation value 710 of "0001" in the hardware instance identifier 702 of the chip 612. The remainder portion 708 may remain unchanged. Node identifier portion of the card 604, the card 606, the chip 608, and the chip 610 may also be encoded with "0001" as each of these belongs to or is a child of the node 602. Moreover, references in a database and/or a query of node 602 as described herein.

Those of ordinary skill in the art may appreciate that a variety of embodiments are provided to manage a database. In particular, individual members of a peer group (e.g., nodes) may have a common overall view of a maximum configuration of an entire domain (e.g., the multi-node computing system 200) without each node initially having to know how it fits into the overall domain. At a later point in time, when a master node assigns it a place in the overall tree or hierarchy, each node may use an option (e.g., any of the options A, B, C) to associate its local hardware data to its overall position in the hierarchy and switch into a fully distributed mode of operation. It also facilitates another node taking over as a master node in case the master node fails.

Indeed, when a node first boots up, it may not know where it fits in the overall system tree or hierarchy, so it may be in a local only mode of operation. In local only mode, the node may refer to only hardware members of the pseudo-node (e.g., pre-assimilation node) when making associations with other data. The node may join the domain of peer nodes (e.g., assimilated into the multi-node computing system 200), and a master node may inform each node of where it fits in the hierarchy, which may trigger each of the individual nodes to switch from local only to distributed mode. Moreover, at about that time, the individual nodes may use an option to convert the pseudo-node references (e.g., references with pre-assimilation references) in substantially all tables to the correct position in the overall hierarchy and switch to distributed mode. Options A, B, C may be three potential ways that the transition from local only mode to distributed mode may occur. Regardless of the transition that is used, after transition, each node may send substantially all of its local data to the master node, which in turn may update substantially all of the other nodes. Once the update is complete, the node may switch to distributed mode, where all updates are sent to the master node, as they occur, which in turn are propagated to substantially all of the other nodes.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a non-transitory computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. For example, an embodiment may include multiple processors connected to a single memory controller, either using separate processor busses from each processor to the memory controller, or using a single shared system bus that is connected to all processors and the memory controller. Other modifications may include separate assigning programs to assign pre-assimilation values, instead of translation programs assigning pre-assimilation values. Post-assimila-

What is claimed is:

1. A method comprising:
at a master node of a multi-node computing system, the multi-node computing system comprising the master node and a plurality of member nodes:
assigning a pre-assimilation value to a hardware instance identifier of a hardware component of a member node before the member node is assimilated into the multi-node computing system, wherein the pre-assimilation value is usable by the master node to assimilate the member node into the multi-node computing system, and wherein the assimilation of the member node into the multi-node computing system corresponds to assigning the member node a position of member node in the multi-node computing system;
sending a post-assimilation value to the hardware instance identifier of the hardware component of the member node to transition the member node from a local only mode to a distributed mode and to update the pre-assimilation value with the post-assimilation value by one of:
updating at least one of a first translation table of the master node or a second translation table of the member node to indicate that the pre-assimilation value maps to the post-assimilation value; or
encoding at least one bit of a member node identifier portion of the hardware instance identifier of the hardware component with the post-assimilation value,
wherein the post-assimilation value is usable by the master node to assimilate the member node into the multi-node computing system; and
merging data of a database of the member node into a distributed database to assimilate the member node into the multi-node computing system, wherein the distributed database includes data from multiple member nodes of the multi-node computing system.

2. The method of claim 1, further comprising:
storing the pre-assimilation value in the first translation table of the master node; and
storing the post-assimilation value in the first translation table of the master node.

3. The method of claim 2, further comprising:
storing the pre-assimilation value in the second translation table of the member node; and
storing the post-assimilation value in the second translation table of the member node.

4. The method of claim 3, further comprising:
identifying at least one reference to the hardware instance identifier in the distributed database or the database of the member node; and
updating the pre-assimilation value in the identified at least one reference with the post-assimilation value by using the first translation table of the master node or the second translation table of the member node.

5. The method of claim 3, further comprising:
receiving a database query referencing the hardware instance identifier;
modifying the database query to use the first translation table of the master node or the second translation table of the member node; and
processing the modified database query.

6. The method of claim 5, wherein modifying the database query to use the first translation table of the master node or the second translation table of the member node includes adding a where clause to the database query to create a join in the first translation table of the master node or the second translation table of the member node.

7. The method of claim 1, wherein assigning the pre-assimilation value to the hardware instance identifier of the hardware component includes encoding at least one bit of the member node identifier portion of the hardware instance identifier with the pre-assimilation value.

8. The method of claim 7, wherein the hardware instance identifier includes a remainder portion in addition to the member node identifier portion, and wherein the remainder portion of the hardware instance identifier is not updated in response to the encoding of the at least one bit of the member node identifier portion with the post-assimilation value.

9. The method of claim 7, further comprising:
identifying at least one reference to the hardware instance identifier in the distributed database or the database of the member node with the pre-assimilation value in the member node identifier portion of the hardware instance identifier; and
updating the pre-assimilation value in the identified at least one reference with the post-assimilation value by the encoding of the at least one bit of the member node identifier portion of the hardware instance identifier with the post-assimilation value.

10. The method of claim 7, further comprising:
receiving a database query with a reference to the hardware instance identifier;
determining whether the member node identifier portion of the hardware instance identifier includes the pre-assimilation value;
modifying the member node identifier portion of the hardware instance identifier referenced in the database query in response to determining that the member node identifier portion includes the pre-assimilation value, wherein in modifying the member node identifier portion includes the encoding of the at least one bit of the member node identifier portion with the post-assimilation value; and
processing the database query with the modified member node identifier portion of the hardware instance identifier.

11. The method of claim 1, wherein the member node is configured to assign the pre-assimilation value to the hardware instance identifier.

12. An apparatus comprising:
a database;
a memory storing program code; and
a processor configured to access the memory and execute the program code to, at a member node of a multi-node computing system, the multi-node computing system including a master node and a plurality of member nodes, the plurality of member nodes including the member node:
assign a pre-assimilation value to a hardware instance identifier of a hardware component before the member node is assimilated into the multi-node computing system, wherein the pre-assimilation value is usable by the master node to assimilate the member node into the multi-node computing system, and wherein the assimilation of the member node into the multi-node computing system corresponds to assigning the member node a position of member node in the multi-node computing system;

receive a post-assimilation value from the master node after the member node has been assimilated into the multi-node computing system, wherein the post-assimilation value is usable by the master node to assimilate the member node into the multi-node computing system;

update the pre-assimilation value with the post-assimilation value by one of:
  updating at least one of a first translation table of the master node or a second translation table of the member node to indicate that the pre-assimilation value maps to the post-assimilation value; or
  encoding at least one bit of a member node identifier portion of the hardware instance identifier of the hardware component with the post-assimilation value; and send data of the database to a distributed database to transition the member node from a local only mode to a distributed mode to assimilate the member node into the multi-node computing system.

13. The apparatus of claim 12, wherein the processor is configured to execute the program code to:
  store the pre-assimilation value in the second translation table of the member node; and
  store the post-assimilation value in the second translation table of the member node.

14. The apparatus of claim 12, wherein the processor is configured to execute the program code to:
  assign the pre-assimilation value to the hardware instance identifier of the hardware component by encoding at least one bit of the member node identifier portion of the hardware instance identifier of the hardware component with the pre-assimilation value.

15. The apparatus of claim 12, wherein the processor is configured to execute the program code to:
  determine whether the member node is in a pre-assimilation state, wherein the update of the pre-assimilation value with the post-assimilation value is responsive to whether the member node is in the pre-assimilation state.

16. A program product, comprising:
program code to, at a member node of a multi-node computing system, the multi-node computing system including a master node and a plurality of member nodes, the plurality of member nodes including the member node:
  assign a pre-assimilation value to a hardware instance identifier of a hardware component before the member node is assimilated into the multi-node computing system, wherein the pre-assimilation value is usable by the master node to assimilate the member node into the multi-node computing system, and wherein the assimilation of the member node into the multi-node computing system corresponds to assigning the member node a position of member node in the multi-node computing system;
  receive a post-assimilation value from the master node after the member node has been assimilated into the multi-node computing system, wherein the post-assimilation value is usable by the master node to assimilate the member node into the multi-node computing system;
  update the pre-assimilation value with the post-assimilation value by one of:
    updating at least one of a first translation table of the master node or a second translation table of the member node to indicate that the re-assimilation value mass to the post-assimilation value; or
    encoding at least one bit of a member node identifier portion of the hardware instance identifier of the hardware component with the post-assimilation value; and
  send data of a database of the member node to a distributed database to transition the member node from a local only mode to a distributed mode to assimilate the member node into the multi-node computing system; and
a non-transitory computer readable medium bearing the program code.

* * * * *